(12) United States Patent
Dong

(10) Patent No.: US 6,713,115 B1
(45) Date of Patent: Mar. 30, 2004

(54) ASIAN ENERGY SOUP AND METHOD THEREFOR

(76) Inventor: Paul L. Dong, 3714 W. Glendale Ave., Phoenix, AZ (US) 85051

( * ) Notice: Subject to any disclaimer, the term of this patent is extended or adjusted under 35 U.S.C. 154(b) by 567 days.

(21) Appl. No.: 09/663,656

(22) Filed: Sep. 18, 2000

(51) Int. Cl.$^7$ ............................ A23L 1/223; A23L 1/28; A23L 1/29
(52) U.S. Cl. ...................... 426/589; 426/638; 426/648; 426/508
(58) Field of Search ................................ 426/589, 638, 426/648, 508

(56) References Cited

U.S. PATENT DOCUMENTS

| 5,437,866 | A | * | 8/1995 | Sun | .......................... | 424/195.1 |
| 5,904,924 | A | * | 5/1999 | Gaynor et al. | ............ | 424/195.1 |
| 6,004,560 | A | * | 12/1999 | Hsu et al. | ................. | 424/195.1 |

FOREIGN PATENT DOCUMENTS

| CN | 1094243 | A | * | 11/1994 |
| CN | 1198944 | A | * | 11/1998 |
| CN | 1328788 | A | * | 1/2002 |
| JP | 11259146 | | * | 3/2001 |

OTHER PUBLICATIONS

Homepage of Chinese Mdicin Acupuncture and Herbs, Broklyn Collect 1998.*
Cathay Herbal Laboratores, "Treating Allergic Diseases with TCM", www.cathayherbal.com/library/.*
The PULSE or Onental Medicine, Chinese Herbs. www-.pulsemed.org/chineseherbs.htm.*

* cited by examiner

*Primary Examiner*—N. Bhat
(74) *Attorney, Agent, or Firm*—Jeffrey D. Moy; Harry M. Weiss; Weiss, Moy & Harris, P.C.

(57) ABSTRACT

A soup contains natural herbs which is healthy for a consumer's diet and further helps to increase the consumer's energy level. The soup has a meat product in a range of from about 45% to about 49% by volume of total composition which provides flavoring and protein to the soup. A liquid in a range of from about 45% to about 49% by volume of total composition is combined with the meat product to separate and dilute the meat product. Spices in a range of from about 1% to about 3% by volume of total composition are added to provide flavoring to the soup. Chinese herbs in a range from about 1% to about 7% by volume of total composition are also added for providing additional flavoring to the soup and for increasing an energy level and muscle strength of the consumer.

21 Claims, No Drawings

ASIAN ENERGY SOUP AND METHOD THEREFOR

BACKGROUND OF THE INVENTION

1. Field of the Invention

This invention relates to food products and, more specifically, to a new soup which contains natural Chinese herbs which is healthy for one's diet and further helps to increase one's energy level upon consumption.

2. Description of the Prior Art

Presently, more and more people seem to be in the health fitness craze. People are trying to exercise more regularly and eat healthier diets in order to stay in shape and live longer. To this end, people are also taking more vitamin supplements and ingesting naturally occurring herbs for medical reasons and also as a way to maintain a healthy diet and to increase one's energy level. Unfortunately, most vitamin supplements and naturally occurring herbs are not very pleasant to ingest as most do not appeal to the consumer's taste buds. Thus, many people do not like taking these items even though they are good for one's health.

Therefore, a need existed to provide a healthy and good tasting food product. The healthy and good tasting food product would be a soup based product. The soup based product would increase the energy level of the user. The soup based would increase the energy level of the user by using natural Chinese herbs.

SUMMARY OF THE INVENTION

In accordance with one embodiment of the present invention, it is an object of the present invention to provide a new healthy and good tasting food product.

It is another object of the present invention to provide a healthy and good tasting food product that increase the energy level of the user.

It is still another object of the present invention to provide a healthy and good tasting food product that increase the energy level of the user by using natural Chinese herbs.

BRIEF DESCRIPTION OF THE PREFERRED EMBODIMENTS

In accordance with one embodiment of the present invention a soup which contains natural herbs which is healthy for a consumer's diet and further helps to increase the consumer's energy level is disclosed. The soup has a meat product in a range of from about 45% to about 49% by volume of total composition which provides flavoring and protein to the soup. A liquid in a range of from about 45% to about 49% by volume of total composition is combined with the meat product to separate and dilute the meat product. Spices in a range of from about 1% to about 3% by volume of total composition are added to provide flavoring to the soup. Chinese herbs in a range from about 1% to about 7% by volume of total composition are also added for providing additional flavoring to the soup and for increasing an energy level and muscle strength of the consumer.

In accordance with another embodiment of the present invention a method of making a soup which contains natural herbs which is healthy for a consumer's diet and further helps to increase the consumer's energy level is disclosed. The method comprises the steps of: providing a meat product in a range of from about 45% to about 49% by volume of total composition which provides flavoring and protein to the soup; providing a liquid in a range of from about 45% to about 49% by volume of total composition to separate and dilute the meat product; providing spices in a range of from about 1% to about 3% by volume of total composition to provide flavoring to the soup; and providing Chinese herbs in a range from about 1% to about 7% by volume of total composition for providing additional flavoring to the soup and for increasing an energy level and muscle strength of the consumer.

The foregoing and other objects, features, and advantages of the invention will be apparent from the following, more particular, description of the preferred embodiments of the invention, as illustrated in the accompanying drawing.

DETAILED DESCRIPTION OF THE PREFERRED EMBODIMENT

A soup product which is healthy and increases one energy level is disclosed. The soup is made mostly of water and meat products. But the soup contains natural Chinese herbs which are good for one's diet and also increases the energy level of the consumer.

The soup is more of a meat broth. The soup contains approximately 45% to about 49% by volume of a meat product. The meat product is used to provide flavoring and to provide a source of protein. The meat product may be any type of meat such as beef, chicken, pork, turkey, or the like. The choice of meat is based on the particular taste of the consumer and is not limited to those mentioned above. The meat product should be a lean type of meat product with the excess fat removed in order to increase the health benefits of the soup product.

The meat product is diluted with a liquid product. The amount of the liquid product is approximately 45% to about 49% by volume. In order to increase the health benefits of the soup product, the liquid product is generally water since water will not add any calories or fat to the soup. However, other liquid products may be used to dilute the meat product. For example, a broth may be used. Broths such as chicken broth, beef broth, or vegetable broth may be used instead of water. These broths tend to add additional flavor to the soup product while having minimal impact on the healthiness of the soup product.

In order to provide additional flavoring to the soup product, a plurality of flavor spices are added to the meat and water mixture. Any type of spice may be used. The type of spices that are added depend on the particular taste of the consumer. The amount of spices that are added is approximately 1% to about 3% by volume. Some of the spices that may be added include sugar, salt, black pepper, ginger powder, and other types of flavor spices. Some of the flavor spices may include anise, cinnamon, garlic powder, and the like. In accordance with one embodiment of the present invention, sugar was added in the amount of approximately 0.005% by volume. The salt and black pepper combination was added in an amount approximately 0.01% by volume. The ginger powder was added in the amount of approximately 0.005% by volume. The flavor spices added were approximately 0.001% to about 0.002% by volume based on the particular taste of the consumer.

A plurality of different Chinese herbs are added to the soup product. The herbs, while adding additional flavoring, help to increase the energy level and muscle strength of the consumer. The amount of Chinese herbs added is approximately 1% to about 7% by volume. Many different Chinese herbs may be added. However, the following Chinese herbs have been found to be extremely beneficial in increasing the energy level and muscle strength of the consumer, especially older individuals. The Chinese herbs include herbaepimedii, rhizoma cistanches, radix angelicae, radix codonopsis pilosulae, astrogalus, hoanglohy, fructus, lycii, rhizoma aconiti, dry ginger, ganoderma lucidum, ziziphi spinosae, ginseng, and cordyceps. The amount of each of the above mentioned may very based on the taste and needs of the consumer. In accordance with one embodiment of the present invention, the Chinese herbs were added in the following amounts: herbaepimedii approximately 0.05% by volume, rhizoma cistanches approximately 0.05% by volume, radix angelicae sinensis approximately 0.004% by volume, radix codonopsis pilosulae approximately 0.05% by volume, astrogalus hoanglohy approximately 0.05% by volume, fructus lycii approximately 0.04% by volume, rhizoma aconiti approximately 0.04% by volume, dry ginger approximately 0.04% by volume, ganoderma lucidum approximately 0.05% by volume, ziziphi spinosae approximately 0.05% by volume, ginseng approximately 0.005% by volume, and cordyceps approximately 0.005% by volume.

The soup product may further include a small amount of liquor. The liquor will have three main benefits. First, the alcohol in the liquor will provide a health benefit. Studies have shown that small amounts of liquor each day may aid in thinning the blood and help in preventing heart attacks. Second, the small amount of liquor will provide additional flavor to the soup. The small amount of liquor will also provide an energy boost to the consumer. The amount of liquor added is enough to provide an energy boost to the consumer but is small enough not to impair the individual. The amount of liquor added is approximately 0% to 2% by volume. The liquor added could be any type. Like the above ingredients, the liquor added is based on the taste of the consumer. In accordance with one embodiment of the present invention, bourbon was added in an amount approximately 0.005% by volume.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A soup which contains natural herbs which is healthy for a consurer's diet and further helps to increase the consumer's energy level comprising, in combination:
   a meat product in a range of from about 45% to about 49% by volume of total composition which provides flavoring and protein to the soup;
   a liquid in a range of from about 45% to about 49% by volume of total composition which is used to separate and dilute the meat product;
   spices in a range of from about 1% to about 3% by volume of total composition which is used to provide flavoring to the soup; and
   Chinese herbs in a range from about 1% to about 7% by volume of total composition for adding additional flavoring to the soup and for increasing an energy level and muscle strength of the consumer wherein the Chinese herbs comprises:
   herbaepimedii approximately 0.05% by volume;
   rhizoma cistanches approximately 0.05% by volume;
   radix angelicae sinensis approximately 0.004% by volume;
   radix codonopsis pilosulae approximately 0.05% by volume;
   astrogalus hoanglohy approximately 0.05% by volume;
   fructus lycii approximately 0.04% by volume;
   rhizoma aconiti approximately 0.04% by volume;
   dry ginger approximately 0.04% by volume;
   ganoderma lucidum approximately 0.05% by volume;
   ziziphi spinosae approximately 0.05% by volume;
   ginseng approximately 0.005% by volume; and
   cordyceps approximately 0.005% by volume.

2. A soup which contains natural herbs in accordance with claim 1 further comprising a liquor in a range from about 0% to about 2% by volume of total composition for providing a health benefit by aiding in thinning blood of the consumer, for providing added flavor to the soup, and for providing an energy boost to the consumer.

3. A soup which contains natural herbs in accordance with claim 1 wherein the meat product is selected from the group consisting of beef, chicken, pork, turkey, and combinations thereof.

4. A soup which contains natural herbs in accordance with claim 1 wherein the liquid is water.

5. A soup which contains natural herbs in accordance with claim 1 wherein the liquid is a broth.

6. A soup which contains natural herbs in accordance with claim 1 wherein the liquid is a broth selected from the group consisting of chicken broth, beef broth, vegetable broth, and combinations thereof.

7. A soup which contains natural herbs in accordance with claim 1 wherein the spices are selected from the group consisting of sugar, salt, black pepper, ginger powder, flavor spices, and combinations thereof.

8. A soup which contains natural herbs in accordance with claim 7 wherein the flavor spices are selected from the group consisting of anise, cinnamon, garlic powder, and combinations thereof.

9. A soup which contains natural herbs in accordance with claim 1 wherein the spices comprise:
   sugar in an amount of approximately 0.005% by volume of total composition;
   salt in an amount of approximately 0.003% by volume of total composition;
   black pepper in an amount of approximately 0.005% by volume of total composition;
   ginger powder in an amount of approximately 0.005% by volume of total composition; and
   flavor spices in an amount of approximately 0.001% by volume of total composition.

10. A soup which contains natural herbs in accordance with claim 9 wherein the flavor spices comprise anise, cinnamon, garlic powder in approximately equal percentages by volume of total composition.

11. A soup which contains natural herbs in accordance with claim 2 wherein the liquor is bourbon.

12. A method of making a soup which contains natural herbs which is healthy for a consumer's diet and further helps to increase the consumer's energy level comprising the steps of:
   providing a meat product in a range of from about 45% to about 49% by volume of total composition which provides flavoring and protein to the soup;
   providing a liquid in a range of from about 45% to about 49% by volume of total composition which is used to separate and dilute the meat product;
   providing spices in a range of from about 1% to about 3% by volume of total composition which is used to provide flavoring to the soup; and
   providing Chinese herbs in a range from about 1% to about 7% by volume of total composition for adding additional flavoring to the soup and for increasing an energy level and muscle strength of the consumer wherein providing the Chinese herbs further comprises:

providing herbaepimedii approximately 0.05% by volume;

providing rhizoma cistanches approximately 0.05% by volume;

providing radix angelicae sinensis approximately 0.004% by volume;

providing radix codonopsis pilosulae approximately 0.05% by volume;

providing astrogalus hoanglohy approximately 0.05% by volume;

providing fructus lycii approximately 0.04% by volume;

providing rhizoma aconiti approximately 0.04% by volume;

providing dry ginger approximately 0.04% by volume;

providing ganoderma lucidum approximately 0.05% by volume;

providing ziziphi spinosae approximately 0.05% by volume;

providing ginseng approximately 0.005% by volume; and providing cordyceps approximately 0.005% by volume.

13. The method of claim 12 further comprising the step of providing liquor in a range from about 0% to about 2% by volume of total composition for providing a health benefit by aiding in thinning blood of the consumer, for providing added flavor to the soup, and for providing an energy boost to the consumer.

14. The method of claim 12 wherein the meat product is selected from the group consisting of beef, chicken, pork, turkey, and combinations thereof.

15. The method of claim 12 wherein the liquid is water.

16. The method of claim 12 wherein the liquid is a broth.

17. The method of claim 16 wherein the broth is selected from the group consisting of chicken broth, beef broth, vegetable broth, and combinations thereof.

18. The method of claim 12 wherein the spices are selected from the group consisting of sugar, salt, black pepper, ginger powder, flavor spices, and combinations thereof.

19. The method of claim 18 wherein the flavor spices are selected from the group consisting of anise, cinnamon, garlic powder, and combination thereof.

20. The method of claim 12 wherein the step of providing spices further comprises the steps of:

providing sugar in an amount of approximately 0.005% by volume of total composition;

providing salt in an amount of approximately 0.003% by volume of total composition;

providing black pepper in an amount of approximately 0.005% by volume of total composition;

providing ginger powder in an amount of approximately 0.005% by volume of total composition; and providing flavor spices in an amount of approximately 0.001% by volume of total composition.

21. The method of claim 20 wherein the step of providing flavor spices further comprises the step of providing anise, cinnamon, garlic powder in approximately equal percentages by volume of total composition.

* * * * *